Aug. 7, 1928. 1,679,521
J. GOOD
ENGINE HEATING APPARATUS
Filed May 21, 1923  2 Sheets-Sheet 1
Fig.1.
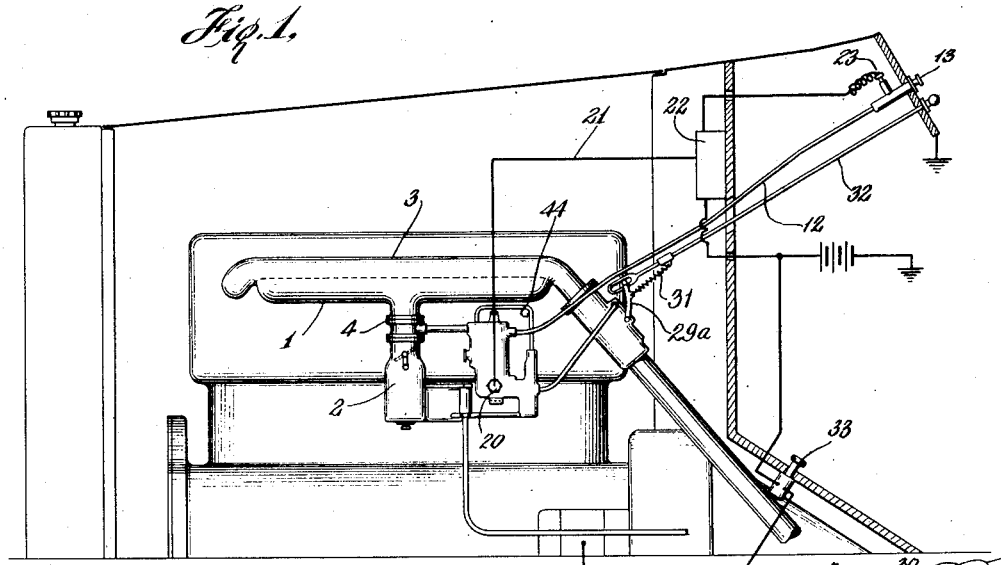
Fig.2.
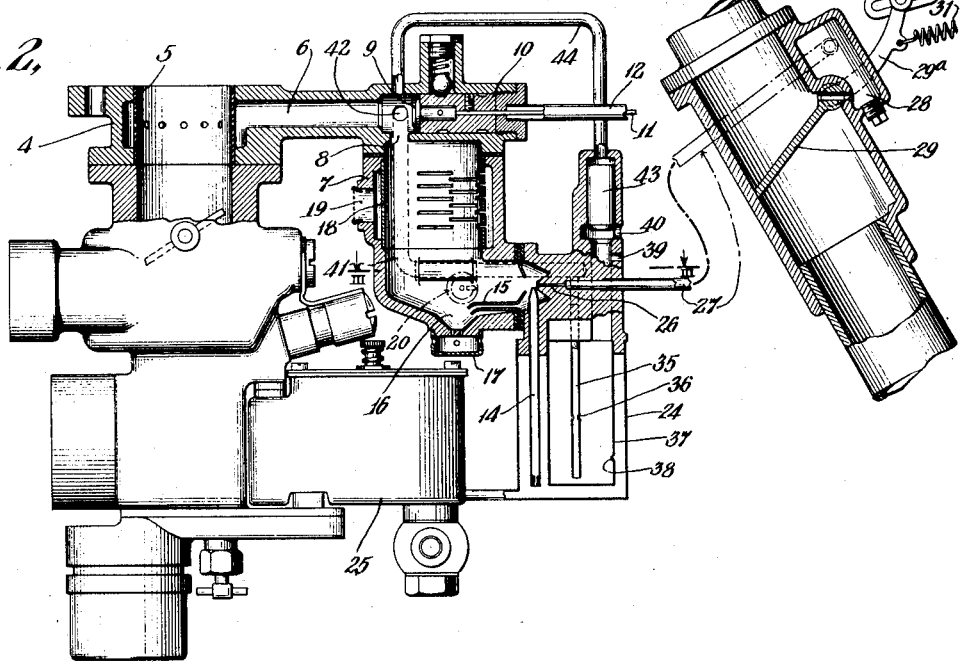
Fig.3.
INVENTOR
John Good
BY
Jeffrey Kimball Eggleston
ATTORNEY

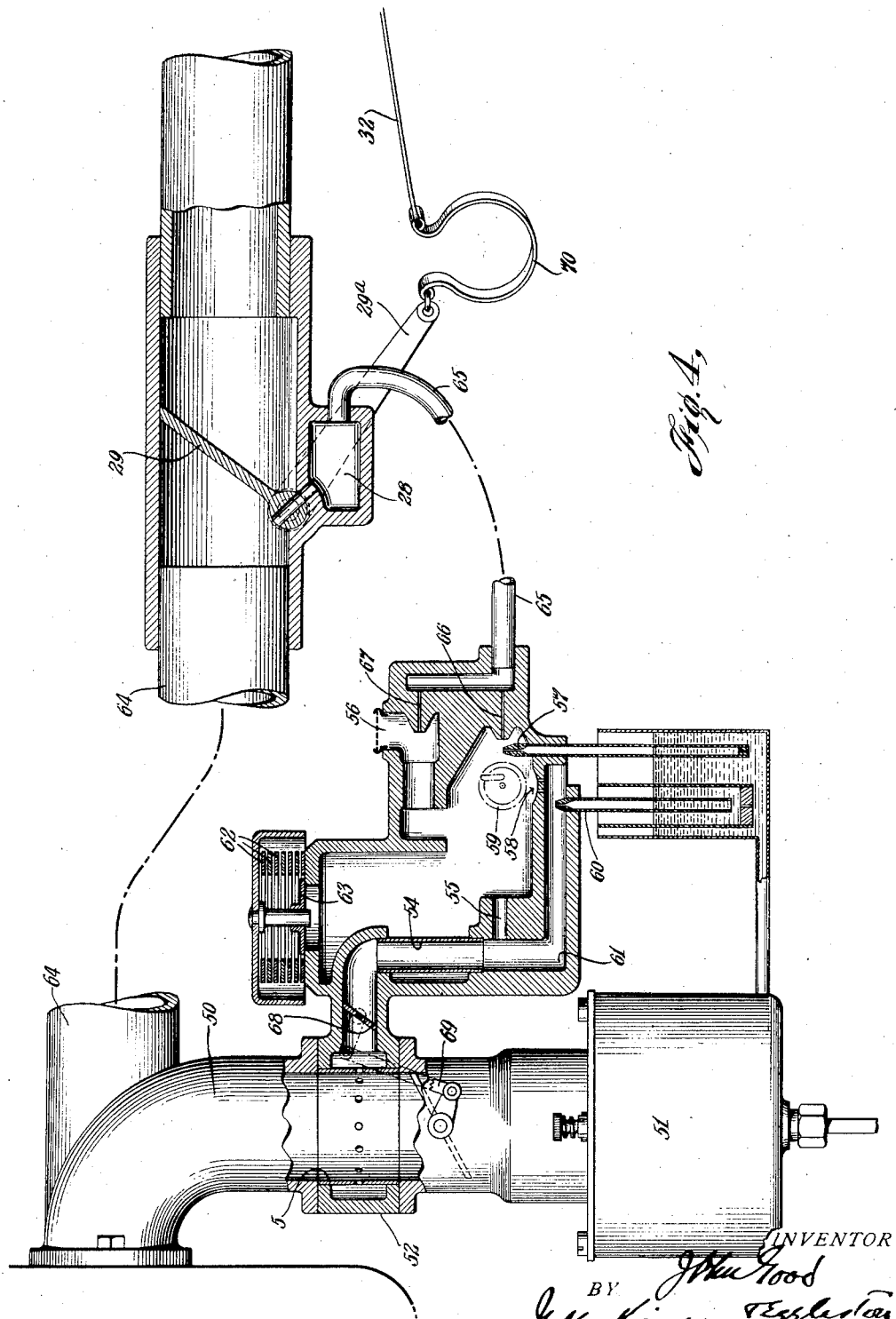

Patented Aug. 7, 1928.

1,679,521

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

ENGINE-HEATING APPARATUS.

Application filed May 21, 1923. Serial No. 640,619.

This invention relates to the use of automatically ignited combustion devices for heating internal combustion engines, more especially in automotive engines, and consists in the utilization of fluid pressure created by the cranking means of the engine, e. g. the electric starting motor, either as a means of operating the combustion device or as a means of assisting or starting its operation. Liquid fuel burners when connected to the engine intake, for operation by the suction effect therein, are subject to failure of ignition on occasions, such, for example, as when the engine starting battery is nearly exhausted or when the engine is very cold and stiff, the cranking speed being then likely to be so slow that the suction produced and transmitted to the combustion device is inadequate to produce an ignitable fuel spray therein. This invention has particular reference to the use of the fluid pressure, created as aforesaid, for producing or assisting the ignition in suction-operated burners, although the principles of the invention may be employed in burners which are not dependent on the engine suction or which, in fact, are not directly related to the engine intake at all.

In the accompanying drawings the invention is illustrated with the principal parts spread apart and brought into the same plane, for convenience of illustration, but it will be understood that such parts are intended to be compactly organized so as to be easily applicable to existing engine designs.

Fig. 1 represents an elevation on a conventional automotive engine with one form of the invention applied to it.

Fig. 2 is a vertical section through the burner structure of Fig. 1.

Fig. 3 is a horizontal, fragmentary section of Fig. 2 on a plane intersecting the pressure jet and the auxiliary fuel passage, as later described; and Fig. 4 represents a modified form in which the burner may, if desired, be operated by pressure.

The engine shown in Fig. 1 comprises an intake manifold 1 and a carburetor 2 constituting the suction intake passage, these parts being of any standard or suitable design and the manifold being preferably associated with the exhaust pipe 3, so that the heat of the exhaust gas will be available for vaporizing the engine fuel when the burner apparatus is not in operation. The function of the burner in the present case is to supply a hot fluid medium to the intake passage, to heat the mixture from the carburetor, and for this purpose it may be connected thereto in any suitable way, as, for example, by means of an adapter fitting, such as indicated at 4. This adapter is connected between the manifold casting and the carburetor and contains an interior perforated thimble 5 in communication with a lateral passage 6. With the adapter thus arranged, the hot medium from the burner attachment is admitted to the intake passage on the engine side of the throttle; but it might be admitted at any other appropriate point according to preference. The medium from the burner heats the mixture from the carburetor not only by mixing therewith inside the intake but also by conduction through the metal wall of the thimble 5. The introduction of the burner products, even as flame, does not inflame the carburetor mixture, and its effect is to render the mixture entering the cylinder easily and instantly ignitable therein, thereby facilitating the starting of a cold engine and assisting its operation during the warming up period and thereafter.

The burner consists of a main casing 7 in communication with the passage 6 through an opening 8, which is under the control of a shut off valve 9. This valve is a small poppet valve loosely mounted in the end of a sliding block 10 and is adapted to be thereby moved against its seat so as to shut the burner off from the engine intake passage. The block 10 is connected by a flexible wire 11 contained in a tube 12 with a push button 13 mounted at the operator's station, for example, on the instrument board of the vehicle. By this means the burner can be connected to the suction intake at the will of the operator. The sliding valve block is provided with a spring detent, as indicated, to hold it yieldingly in each of its two positions.

The suction effect transmitted to the burner casing draws in liquid fuel through the burner fuel tube 14 and such fuel is guided by the shield 15, so that it flows into the depression or well 16 in the bottom of the burner casing. One or several fine air holes drilled in the lower part of this depression allows air to be drawn therethrough so as to spray the fuel upward in the burner. A perforated cup 17 is applied to the bottom of the burner to protect these holes against stoppage by foreign bodies. The suction on the burner likewise draws in a supply of combustion supporting air through the slits or perforations in the air distributing shell 18 and the main air entrance 19. Ignition is produced by an electric igniter, for example, a spark plug placed at 20 and the resulting flame and combustion products are drawn off through the port 8 and passage 6 into the suction intake of the engine, with the effect above explained.

The spark plug 20 is energized through its circuit connections 21 and a spark coil 22, which are rendered active by a switch 23 arranged to be closed by pulling the button 13. Instead of the circuit arrangement shown, the spark plug might be connected to the regular ignition system of the engine, as is sometimes done, or to a magneto or otherwise, as preferred.

The burner fuel tube 14 dips by its lower end into a fuel cup 24 connected in any suitable way with the float bowl 25 of the main carburetor and the upper end of said tube is placed in atomizing relation to a pressure jet 26 supplied with fluid pressure through a pipe 27 from the exhaust pipe 3. For this purpose the pipe 27 is connected to the chamber 28, which is adapted to receive the fluid medium passing through the exhaust pipe when the switch valve 29, hinged in the latter, is closed or moved toward its closed position. In the present case the chamber 28 is put in communication with the exhaust pipe, on the engine side of the valve 29, through a passage which is formed in the hinge of the valve 29 so as to register with a port opening into the chamber 28 when the valve 29 is closed. The extended hinge of the valve 29 is equipped with a crank arm 29ª and the latter is connected by a lost motion slot 30 and spring 31 with a pull rod 32 extending to a point adjacent the pull button 13. When the rod 32 is pulled outwardly it acts through the spring 31 to close the switch valve 29 and thereby direct the fluid medium in the exhaust pipe through the hinge ports into the chamber 28 and thence to the pressure jet 26. The spring 31 is adapted to yield in the event of an excess flow from the engine through the exhaust pipe and thereby maintain a substantially uniform pressure at the jet. By virtue of the lost motion slot connection with the crank 29 the operator may, however, positively hold the valve 29 in a closed position, if necessary.

In the operation of the apparatus as thus far described the starting of the engine is accomplished by pulling out the button 13 which connects the burner to the engine and then closing the starting motor circuit by pressing the starting pedal 33. The suction effect produced by the rotating engine is transmitted to the burner, creating a mixture of fuel and air therein, which is ignited and the resulting flame and products of combustion pass to the engine along with the mixture from the main carburetor. If the suction effect thus established by the cranking of the engine happens to be inadequate to produce a mixture capable of ignition by electric spark, or by whatever ignition means is employed, the operator may then close the switch valve 29 in the exhaust line of the engine to establish a high pressure fuel atomizing jet in the burner. This makes a fine, fog-like mixture which is instantly ignitable, so that the heat of the burner becomes immediately available and the engine accordingly starts promptly in action on its own combustion. The shield device 15 inside the burner is merely for protecting the orifice of the fuel tube 14 from the possible deposit of carbon and for conducting the fuel from such protected orifice to the spraying well 16.

It is desirable to admix with the combustion products of the burner a small quantity of fuel, which is accomplished in the present case by providing what may be termed an auxiliary carburetor of small dimensions in the burner structure. This carburetor is represented by the fuel tube 35, provided with a small air hole 36 and dipping into a fuel well 37, the latter being located in the fuel cup 24 and receiving fuel therefrom through a restricted opening 38. The well 37 is vented to atmosphere through the holes 39 and 40. The upper end of the fuel tube 35 communicates with a duct 41 shown in full lines in Fig. 3 and in dotted lines in Fig. 2. The duct passes through or in close relation to the interior of the burner, being heated thereby, and opens into the chamber of valve 9 at point 42 adjacent the burner outlet 8 above mentioned. Thus, whenever the engine suction effect is transmitted to the burner it is also transmitted to this auxiliary fuel source, which thereby produces a mixture of fuel and air and burner products passing to the engine intake. At first, the fuel delivery is excessive until the level in 37 reaches the point at which it is maintained by inflow through 38. This initial richness of fuel supply helps in producing the initial engine explosions; thereafter the delivery is substantially constant. The effect of the auxiliary fuel supply is to furnish a larger amount of fuel to the engine than would otherwise be supplied with a given set of the engine throttle. Air to combine with this fuel may be variously supplied. The burner may be made to draw in a correspondingly larger portion of air than necessary for the burner fuel itself, thus to compensate for this additional fuel, or the air hole 36 may be large enough to supply such additional air, the object being to compose the hot medium so that it will not unduly vary the proportions of the mixture ultimately entering the cylinders. This enables the device to be cut in or out without affecting the efficiency of the engine combustion.

As above stated the auxiliary carburetor supplies a mixture of fuel and air initially rich but thereafter of substantially constant proportions. It may also be utilized as a means of providing a momentarily abnormal supply of fuel to the engine under certain conditions, as, for example, when the main carburetor throttle 3 is suddenly opened. At such times a momentary increase of fuel supply is desirable especially if the engine is not yet warmed up. For this purpose one of the air vents (40) which normally supply air to the auxiliary carburetor is arranged to be automatically closed by a plunger 43. This plunger is normally held elevated by the exposure of its upper end to the suction effect of the engine through the duct connection 44 with passage 6. When the intake suction suddenly drops, as by the quick opening of the main throttle, this plunger 43 falls and thereby restricts the air flow to the auxiliary carburetor causing the latter to deliver an excessively rich mixture through the duct 41 into the passage 6. This condition is momentary only because the effect of the opened throttle is to speed up the engine and thereby restore the suction to a degree which will again hold the plunger 43 elevated.

Referring now to the form of Fig. 4, 50 designates the intake manifold of an engine and 51 the ordinary carburetor connected to it by an adapter 52, as before. Through this adapter the engine suction effect is transmitted to the burner by way of passage 54 and burner outlet 55. The burner comprises an air inlet 56, a fuel tube 57, a spraying well 58 with fine holes in its bottom, and a spark plug 59, all having the same functions as in the form above described. Auxiliary fuel is admitted to the burner products from the auxiliary fuel tube 60 through the passages 61 and 54. The burner and auxiliary fuel tube are supplied with fuel in the same way as in the former case.

This burner, however, is supplied with an outlet to atmosphere which is baffled by means of a series of annular plates 62 to prevent the passage of flame therethrough and which is closed by a light weight gravity seated check valve 63, so that the engine suction effect can draw in no air through this outlet. The fluid pressure derived from the exhaust pipe 64 through a tube 65 is used in this burner partly to make a high pressure spraying jet 66 and also a secondary jet 67 associated with the air inlet 56 so as to cause the inflow of a certain amount of air to support the combustion in the burner independently of any air drawn into the burner by the effect of the engine suction. The products of combustion not drawn into the engine intake pass out to atmosphere past the check valve 63. The passage 54, like the passage 41 in the form first described, is formed in part of a short piece of thin walled tubing directly exposed to the flame in the burner itself, this being for the purpose of promoting the heating of such duct and the auxiliary fuel therein.

A small butterfly valve 68 controls the outflow of burner products and the auxiliary fuel to the adapter and this valve is connected by a link 69 with the engine throttle, so that it moves in unison with the latter, under proper adjustment. This is an additional attachment to the apparatus and is not necessary except for providing some predetermined proportion between the delivery of the carburetor and the burner. Thus in the present case the burner delivery rate tends to increase as the engine throttle is opened and the work done by the engine increases, so as to give more heat to the mixture on such occasions.

In this form of the invention the exhaust switch valve 29 may be quite the same as in the preceding form, but the pull rod 32 is connected to the crank arm 29ª of the valve 29 by means of a bowspring 70 which is stiff enough to hold the valve closed while the engine is being cranked, but yields to vent some of the engine exhaust after the combustion cycle has been established and thereby limit the burner operating pressure.

It will be apparent from Fig. 4 that when the engine is cranked with the switch valve 29 closed, the burner is subject simultaneously to suction at its outlet end and to pressure at its inlet end, the pressure difference being considerable and adequate to produce an ignitable spray and excellent burner operation. Immediately that valve 29 opens, or is opened by the operator, the suction effect alone continues the burner in action.

It will be clear that various omissions, additions and other changes may be made in the structures above illustrated without departing from the essential principles of this invention as set forth in the subjoined claims.

I claim:—

1. The combination of an internal combustion engine having a cranking means, a liquid fuel burner organized to supply heat to the engine and means transmitting pressure created in the engine cylinder by said cranking means to said burner.

2. The combination of an internal combustion engine, a liquid fuel burner organized to supply heat thereto, and means for utilizing pressure in the exhaust line of the engine for operating said burner.

3. The combination of an internal combustion engine having an electric starting motor and an electrically ignited liquid fuel burner having a fuel spraying means and organized to supply initial heat to the engine, means for utilizing pressure generated in the engine cylinder by the operation of said starting motor for operating said spraying means and means whereby the igniter in said burner may be energized coincidently with said pressure utilizing means.

4. In an internal combustion engine, the combination with the exhaust line and a liquid fuel burner, of a pressure communication between the former and the latter and a valve associated with the exhaust line for diverting pressure through said communication.

5. The combination with a liquid fuel burner and the exhaust line of an internal combustion engine, a valve therein adapted to transmit pressure to the burner and means imposing a limit on the pressure transmitted.

6. In an internal combustion engine, the combination with the exhaust pipe and means for diverting pressure therefrom comprising a movably mounted valve adapted to obstruct flow through said pipe, a spring holding said valve in said obstructing position, and a pressure outlet from said pipe opened by said valve when in said obstructing position.

7. The combination with an engine intake, a liquid fuel burner operated by the suction therein and including a fuel tube, a pressure jet in aspirating relation thereto, a spraying well in the burner, and an exhaust pipe connection to supply said pressure jet.

8. The combination of an internal combustion engine, a liquid fuel burner organized to supply heat thereto, and means for conjointly utilizing the suction of the intake and the pressure in the exhaust side of the engine for operating said burner.

9. The combination of a mixing and combustion space having an outlet for combustion products and provided with an entrance means for liquid fuel and air, and means for simultaneously applying suction to said outlet and pressure to said air entrance means.

10. The combination of a burner containing an electric igniter, pressure means for introducing air and liquid fuel spray thereto and suction means for withdrawing the combustion products therefrom and adapted to operate the same.

11. The combination of the exhaust line of an internal combustion engine and means for diverting pressure therefrom comprising a valve, means for yieldingly holding the same in a pressure diverting position and means for positively holding the same in said position.

12. The combination in an internal combustion engine, of a main carbureter, an auxiliary carbureter, and means controlled by sudden drop of suction effect in the engine intake for increasing the fuel delivery of said auxiliary carbureter.

13. The combination of a passage conducting a fluid medium, means for diverting the medium therefrom comprising a valve, means for yieldingly holding the valve in its diverting position and means for positively holding it in said position.

14. The combination with an internal combustion engine intake, of a main carbureter, an auxiliary carbureter, means controlled by sudden drop of suction effect in the engine intake for increasing the fuel delivery of said auxiliary carbureter, and liquid fuel combustion means for supplying heat to the intake.

15. The combination with an engine intake, of a carbureter and an auxiliary fuel supply, the latter having means controlled by sudden drop of suction effect for increasing its fuel delivery and means for mixing hot combustion products with said auxiliary fuel supply.

16. The combination with an engine intake, of a carbureter an auxiliary fuel supply having means controlled by sudden drop of suction effect for increasing its delivery, a suction burner for heating the auxiliary fuel and means for shutting off said auxiliary supply.

17. The combination of an internal combustion engine, a liquid fuel burner organized to supply heat thereto, means for conjointly utilizing the suction of the intake and the pressure in the exhaust side of the engine for operating said burner, and means for discontinuing the suction operation of the burner.

18. The combination with an engine, having a normal carbureter, of a liquid fuel burner containing an electric igniter, and connected on one side to the suction side of the engine, and on the other side, to the pressure side of the engine, and organized to supply heat to the mixture produced by said carbureter.

19. The combination with an engine intake, a liquid fuel burner operated by the suction therein and including a pressure jet for aspirating fuel into it, a suction jet and spraying well in the burner, and an exhaust pipe connection to supply said pressure jet.

20. The combination of an internal combustion engine having a carbureter producing an unheated combustible mixture, an electrically ignited liquid fuel burner adapted for supplying heat to said mixture, and means whereby pressure created in the engine cylinder produces a spark ignitable spray in said burner.

21. The combination of an internal combustion engine, a carbureter, a liquid fuel burner organized to deliver its products to the engine intake, an auxiliary fuel supply adapted to be heated by said burner and means independent of the intake for transmitting pressure created by the operation of the engine to said burner.

22. The combination of an internal combustion engine having a cranking means, a liquid fuel burner organized to supply heat to the engine and normally operated by the suction produced thereby, and means transmitting pressure created in the engine by said cranking means to said burner.

23. The combination of an internal combustion engine having a cranking means and a suction-operated carbureter, a liquid fuel burner operating independently of said carbureter, and means transmitting pressure created in the engine cylinders by said cranking means to the burner for producing an ignitable fuel spray in the latter.

24. The combination of an internal combustion engine power plant, a liquid fuel burner to supply heat to a part of said plant and means for utilizing engine exhaust pressure for operating said burner to heat said part.

In testimony whereof, I have signed this specification.

JOHN GOOD.